United States Patent [19]

Lippold et al.

[11] 4,038,467
[45] July 26, 1977

[54] GALVANIC CELL

[75] Inventors: Hans-Martin Lippold, Glashutten; Dieter Spahrbier, Fischbach, Taunus, both of Germany

[73] Assignee: Varta Batterie Aktiengesellschaft, Hannover, Germany

[21] Appl. No.: 655,485

[22] Filed: Feb. 5, 1976

[30] Foreign Application Priority Data

Feb. 15, 1975 Germany .................... 2506399

[51] Int. Cl.² ........................................... H01M 6/02
[52] U.S. Cl. ..................................... 429/219; 429/229
[58] Field of Search ............... 136/20, 30, 31, 120 R, 136/107, 111; 429/219, 229, 206; 29/623.1

[56] References Cited

U.S. PATENT DOCUMENTS

| | | | |
|---|---|---|---|
| 3,055,964 | 9/1962 | Solomon et al. | 136/20 X |
| 3,615,858 | 10/1971 | Soto-Krebs | 136/107 |
| 3,925,102 | 12/1975 | Kozawa | 136/111 |

Primary Examiner—Anthony Skapars
Attorney, Agent, or Firm—Weiser, Stapler & Spivak

[57] ABSTRACT

In a galvanic cell with negative zinc electrode and positive electrode of AgO, the AgO is surface-reduced to $Ag_2O$, and insulated from the current takeoff, to which connection is made only by a porous silver layer.

13 Claims, 7 Drawing Figures

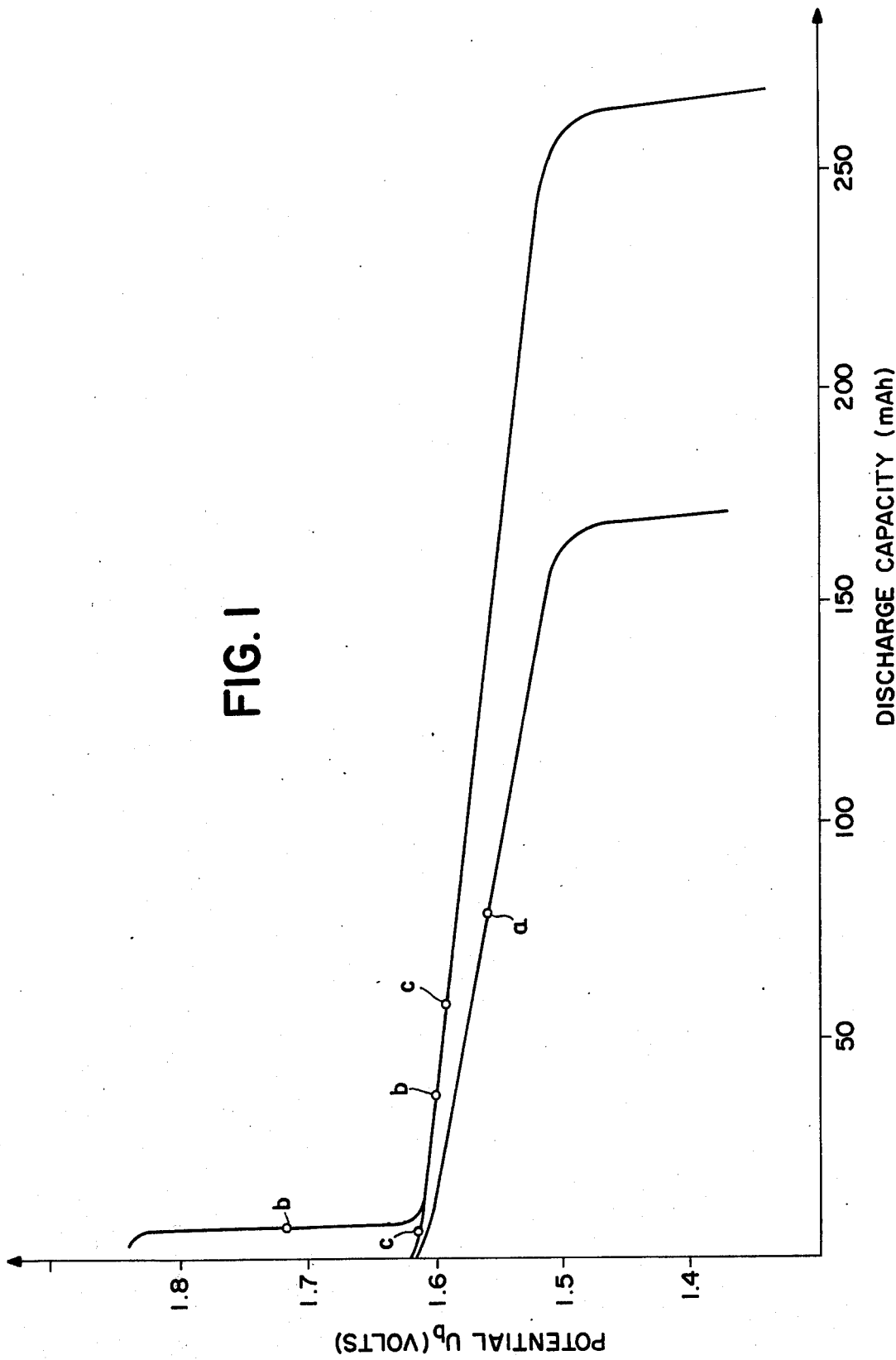

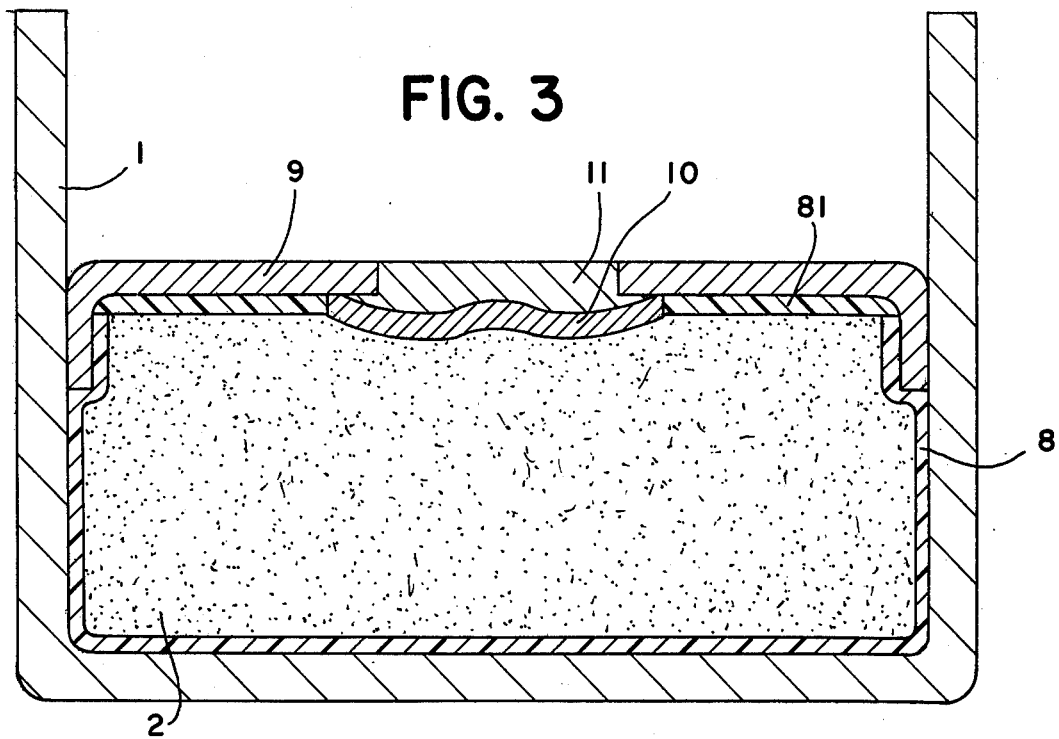
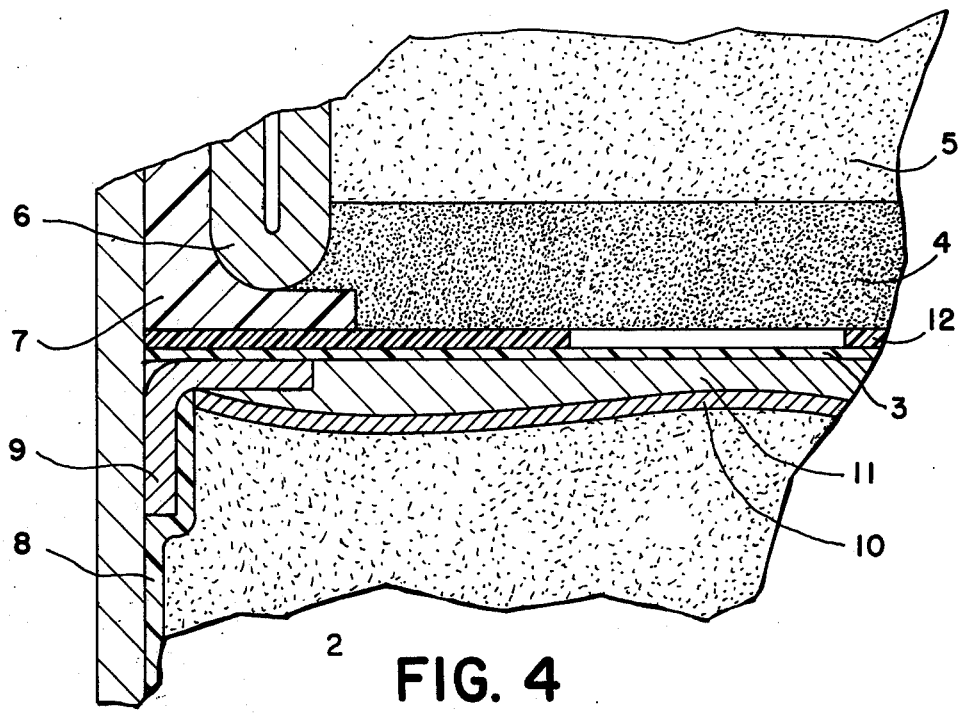

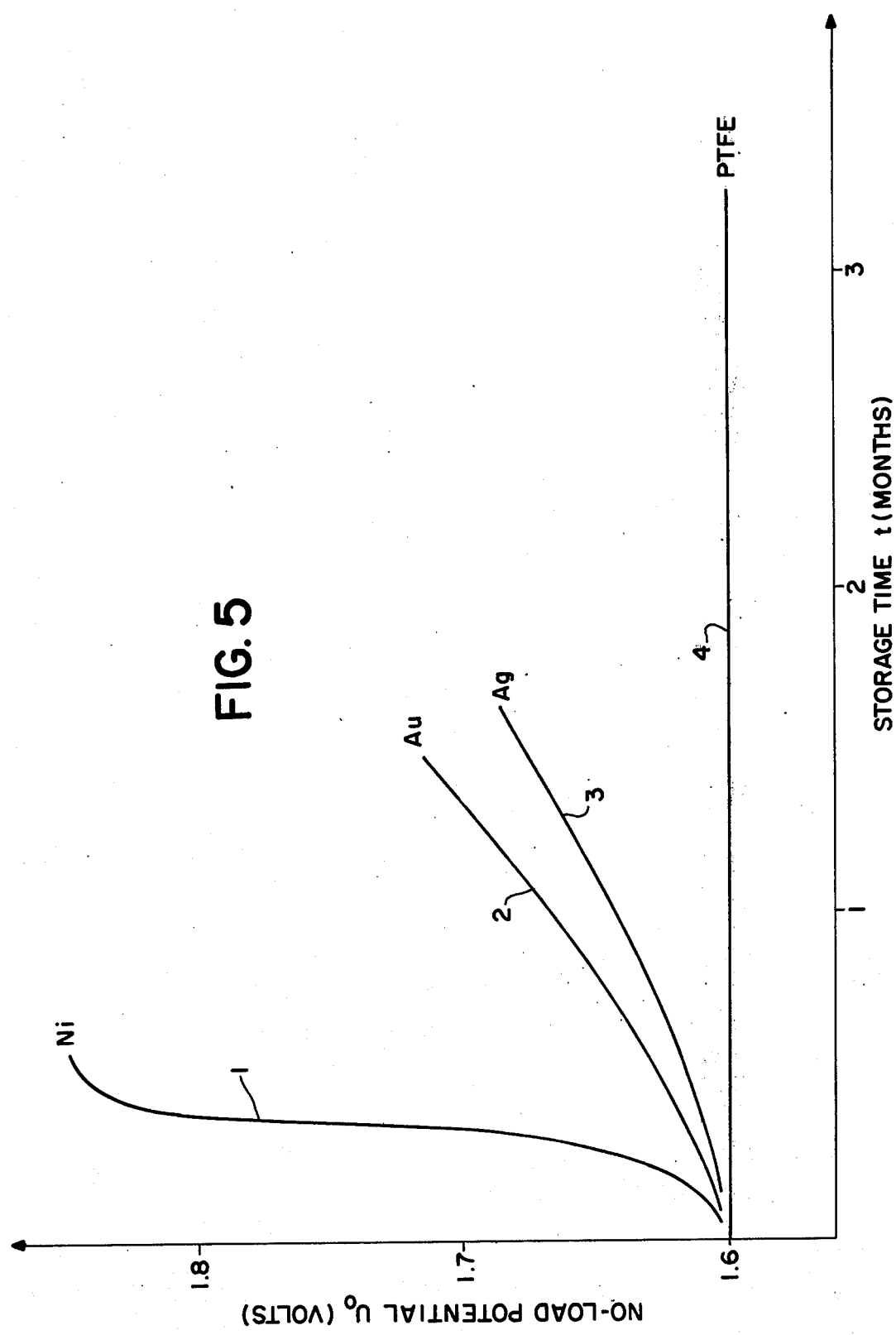

GALVANIC CELL

This invention relates to a galvanic cell with negative zinc electrode and positive electrode of bivalent silver oxide (AgO) as well as alkaline electrolyte. The bivalent silver oxide has its surface so surface-reduced that the cell possesses the discharge voltage of the $Ag_2O/Zn$-System. The invention also relates to a method of producing such a cell.

Electrochemical systems of high energy density are needed, for example, to supply energy for electronic wrist watches. Currently, only two cell systems are used for this purpose as a practical matter, namely the HgO/Zn-System and the $Ag_2O/Zn$-System. The HgO/Zn-System has an energy intensity of 520 Wh/dm$^3$, which is about 20 percent higher than that of the $Ag_2O/Zn$-System. On the other hand, at 1.55 volt, the discharge potential of the $Ag_2O/Zn$ is about 250 mV higher than that of the HgO/Zn-System, which is advantageous for the operation of the electronic components. A desirable system should therefore have an energy density of 520 Wh/dm$^3$ or more and a discharge potential of about 1.5 volt. These requirements are met by an $AgO/Ag_2O/Zn$-System in which the AgO phase determines the capacity and the $Ag_2O/Zn$-System the discharge potential.

The $Ag/Ag_2O/AgO$-electrode has heretofore been frequently investigated from the electrochemical standpoint. (See, for example, Fleischer and Lander, Zinc-Silver-Oxide Batteries, 1971, John Wiley & Sons, Inc.). Thus it is known, for example, that the specific charge density of the compact $Ag_2O$ material amounts to 1.660 mAh/cm$^3$ and that of the compact AgO material 3.220 to mAh/cm$^3$. These figures point to the utilization of AgO. However, there is the off-setting disadvantage that the discharge of the AgO/Zn-System involves a voltage step of about 250 mV. The first portion of the discharge takes place, depending on the load, at a voltage between 1.7 volt and 1.8 volt and is attributable to the AgO/Zn-System. The second part of the discharge takes place at a voltage of 1.4 volt to 1.55 volt and is determined by the $Ag_2O/Zn$-System. The capacity is determined by the AgO which has not yet been transformed. Depending upon the load, the type of grain structure of the AgO powder, its pretreatment and its geometrical arrangement inside the cell, the capacity attributable to the potential of the AgO/Zn-System prevails up to 30 percent of the entire discharge period. The remaining part of the discharge potential corresponds to that of the $Ag_2O/Zn$-System.

The voltage drop of about 250 mV which is characteristic of the discharge of the AgO/Zn-System is highly undesirable in an energy source for electronic precision equipment.

Preferable is a silver oxide system whose no-load potential corresponds to the $Ag_2O/Zn$-Cell while its capacity is determined by the AgO phase.

In that connection, it is known from an article by T. P. Dirkse, in the Journal of the Electrochemical Society, 109 (1962) 3, pages 173 to 177, that during electrochemical partial discharge of AgO tablets the no-load potential of the surface-reduced silver oxide tablet corresponds to the $Ag_2O/Ag$-System, even though the bulk consists of AgO. Moreover, because of partial discharge, there form at the contact small regions of metallic Ag which are in direct contact with the $Ag_2O$ phase.

The construction of an AgO button cell, in which the potential of the $Ag_2O/Zn$ and the capacity of the AgO/Zn-System are utilized is described in U.S. Pat. No. 3,615,858. In order to maintain the potential of the $Ag_2O/Zn$-System even under no-load condition, the AgO tablet must be separated from the electrical contact by an $Ag_2O$ layer, i.e. insulated. A cell of this construction can exhibit the approximately doubled specific charge density of the AgO surrounded with $Ag_2O$.

To produce an $Ag_2O$ layer on the AgO tablet, various techniques are disclosed in that patent. For example, there is the application on all sides of the AgO tablet of a thin $Ag_2O$ surface layer by means of $Ag_2O$ powder using an application under pressure. Alternatively, there is the production of a thin $Ag_2O$ surface layer on the AgO tablet by chemical reduction of the latter, or production of a thin $Ag_2O$ surface layer on the AgO tablet by electrochemical reduction thereof. Further more, a thin $Ag_2O$ surface layer can be produced on the AgO tablet by a reduction reaction between the contact material of the cell cup and the AgO tablet.

In the first-mentioned processes, the following method steps are required to produce the positive half of the button cell:

a. pressing of the AgO tablet.

b. surface reduction of the AgO tablet, or application of a thin $Ag_2O$ layer c. pressing of the AgO tablet surrounded by a thin $Ag_2O$ layer into the cell cup (current take-off).

Of these method steps, particularly step (c.) is critical because the tablet may be deformed through pressing so that its thin $Ag_2O$ layer tears. Tearing of the $Ag_2O$ layer creates the danger of electrical contact between the AgO and the current take-off, or cell cup, whereupon the voltage stability is no longer assured: the potential rises from 1.6 volt to 1.8 volt. This danger can be reduced by strong surface reduction of the AgO tablet accompanied by formation of a surface silver layer. However, this is at the expense of the useable capacity.

Another disadvantage is that, depending upon the type of reducing medium, copious rinsing of the surface-reduced AgO tablet is necessary before insertion in the cell cup. These procedures are time consuming and further create the risk of damage to the $Ag_2O$ layer.

The last mentioned process also subdivides into three method steps in which, however, the time sequence of steps (b.) and (c.) is interchanged. This process has the fundamental advantage that tearing of the $Ag_2O$ layer cannot take place because it forms inside the cell cup. Its disadvantage is that the cell cup must be equiped with a layer which reacts with the AgO fo form $Ag_2O$. According to U.S. Pat. No. 3,615,858, zinc, copper, nickel and silver are suitable for this layer. Another drawback is that the required reaction between AgO tablet and the surface layer of the cell cup takes place relatively slowly and only in the presence of an electrolyte. Moreover, predetermined conditions for the thickness of the reactive layer must be maintained, and various foreign ions as wel as contact resistances arise depending upon the type of layer material, which exert an unfavorable influence upon both the voltage stability of the cell and its capacity.

Accordingly, it is an object of the invention to provide a galvanic cell of the type under discussion which has high voltage stability during discharge, whose self discharge is very low and which is simple to manufacture.

It is another object to provide such a cell in which the electrical perameters, especially voltage and capacity, are not subject to wide tolerances attributable to the manufacturing process by which it is made.

These and other objects which will appear are achieved in accordance with the invention by insulating the bivalent silver oxide from the positive current take-off by means of an electrically non-conductive plastic layer. The electrical contact of the bivalent silver oxide and the current take-off takes place by way of a porous silver layer. This layer confronts the counter electrode and is in contact with the bivalent silver oxide ($Ag_2O$). The porous silver layer is electrically connected to the current take-off by means of a metallic contact.

For further details reference is made to the discussion which follows in light of the accompanying drawings, wherein FIG. 1 shows that the discharge characteristics of various silver oxide cells;

FIG. 3 shows certain details of another embodiment of a button cell according to the invention;

FIG. 4 shows still another embodiment; and

FIG. 5 shows the relationship between cup material and voltage stability of an AgO/Zn-cell under conditions of storage at 45° C.

All of the cells described are of the so-called button cell type, whose basic constructional features are well known to those skilled in the art. The same reference numerals are used in the several figures to denote similar elements.

FIG. 1, to which reference may now be had, shows various discharge characteristics of different button cells of conventional size (diameter equals 11.6 mm; height equals 5.4 mm). Curve a shows the discharge characteristic for a load resistance of 6 K Ω of such a cell utilizing univalent silver oxide and zinc as the active material. Curve b shows the discharge characteristic under the same conditions if bivalent silver oxide is used instead of univalent. This curve b shows the voltage step of about 250 mV which is characteristic of bivalent silver oxide, and also the about 40 percent higher capacity. Curve c corresponds to a cell construction according to the invention. As can be seen the previously mentioned drawbacks of the known constructions are avoided and the capacity and/or the shelf life of the cell is increased.

Figure 2A:
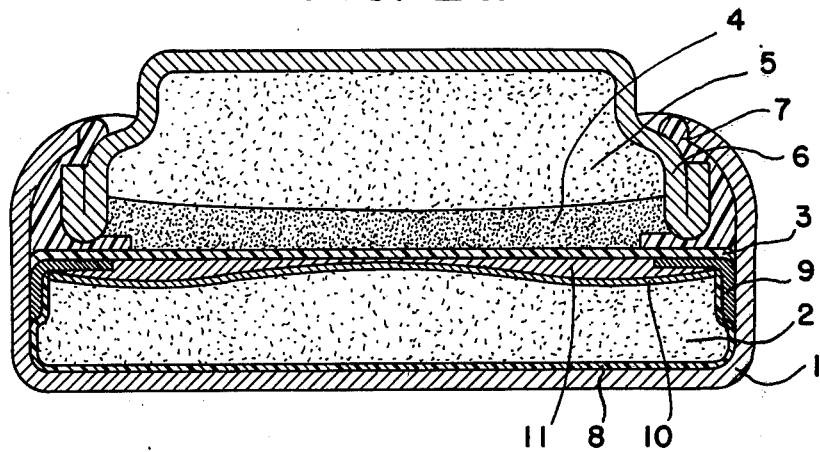
FIGS. 2a through 2c show, in diagrammatic form, the construction of one embodiment of a $AgO/Ag_2O/Zn$-button cell embodying the invention.

FIG. 2a, to which reference may now be had, illustrates diagramatically in cross-section such a button cell. It includes a cell cup 1, the AgO mass 2, the separator 3, the electrolyte absorption layer 4, negative mass 5, cell cover 6, and sealing ring 7. Compared to a conventional button cell the present $AgO/Ag_2O/Zn$-cell has additional characteristics important for its functioning.

These involve layer 8, as well as layers 10 and 11 and contact ring 9 which serves to insure good electrical contact.

Layer 8 serves to provide electrical insulation of the AgO mass 2 from metallic cup 1. Preferably, this layer 8 is so arranged that (see enlarged fragmentary view in FIG. 2c) it terminates between contact ring 9 and the outer edge of layers 2, 10 and 11. It therefore protects tablet 2 completely from housing portion 1, i.e. cup 1, both on the bottom and on its circumference. Preferably layer 8 consists of polytetrafluoroethylene, polyethylene or other oxidation and acid resistant plastic material.

Layer 10 consists of silver-I-oxide ($Ag_2O$) and layer 11 of porous metallic silver. The method of producing these layers is described further below.

Electrochemical contact between porous silver layer 11 and cup 1 is provided by a contact ring 9 which preferably consists of silver. Porous silver layer 11 is an intimate electrical contact with silver-I-oxide layer 10. This layer provides the sole electrical contact with AgO mass 2.

Figure 2C:
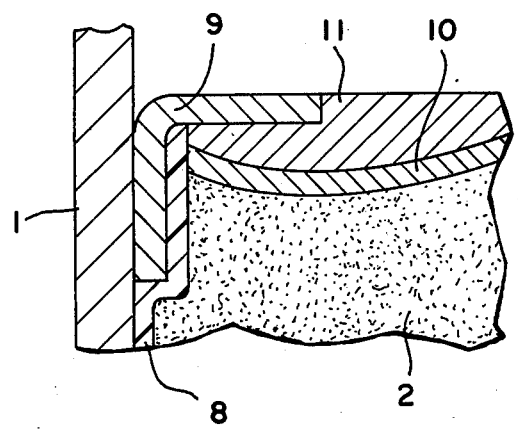
Figure 2B:
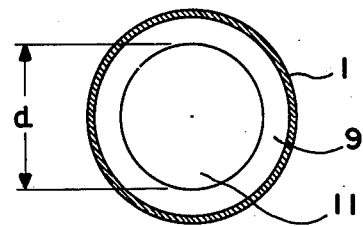

FIG. 2b shows a top view of the positive half cell portion. These are visible cell cup 1, contact ring 9, and porous silver layer 11. In this figure the diameter of the inner opening of contact ring 9 is designated by dimension symbol d.

As is apparent from FIG. 2c, which shows in diagrammatic form an enlarged fragment in the region of contact ring 9, the porous silver layer 11 is thicker in the vicinity of contact ring 9 than in the middle of the electrode. This profile of layer 11 results from electrochemical surface reduction. This automatically produces $Ag_2O$ layer 10.

The load capacity of the cell is determined in part by the degree of coverage of the surface of layer 11. The less this coverage, the greater the current loading capacity, but the greater also the self discharge of the cell. Contact ring 9 may cover between 10 and 98 percent of electrode surface 11. A construction with little coverage, e.g. between 10 and 40 percent, is suitable for applications in which relatively rapid discharge of the cell takes place. In applications which involve very slow discharge, as, for example, in electronic watches (discharge time in excess of one year), it is desirable to reduce surface 11. This can be accomplished, for example, by reducing the inner diameter d of contact ring 9 until the coverage is in the range of 50 to 90 percent. In this connection it is important to have electrical insulation between the top end of AgO tablet 2 and widened contact ring 9 by means of insulating layer 81. A diagrammatic illustration of such a construction is shown in FIG. 3 which is a cross-section of the positive cell portion in the region of contact ring 9. This shows that insulating layer 8, by means of horizontal extending portion 81, also protects a considerable portion of the top surface of electrode 2 below contact ring 9. Here, too, it will be seen that porous silver layer 11 has greater thickness in the vicinity in the edge of contact ring 9 than in the middle.

The embodiment of FIG. 4 corresponds generally to the construction of FIG. 2a. In addition it includes a non-conductive diaphragm 12. This is positioned between membrane 3 and electrolyte bearing layer 4. Its interior apature is determined in the same manner as has been explained with reference to contact ring 9. In this way the effective cross-section of layer 11 is again reduced and the shelf life of the cell improved. The voltage stability at no load is also improved the diaphragm may be made of polytetrafluoroethylene, polyethylene, or other oxidation and acid resistant plastic material. A prerequisite for voltage stability of the $AgO/Ag_2O/Zn$-cell resides, in any case, in the prevention of a direct electrical contact between the AgO phase and the cell cup. This is a significant feature of the present invention. FIG. 5, to which reference may now be had, demonstrates the significance of electrical insulation of the AgO tablet from the cell cup, as well as the relationship between the cup material and the voltage stability of the cell.

FIG. 5 shows a test of storage at 45° C of electrically non-loaded cells. The construction of the cells tested corresponds to that of FIG. 2. The only variation was in the layer with which cell cup 1 was coated. Curves 1, 2 and 3 show the results of using about 2 micron thick layers of nickel, gold and silver, respectively. Curve 4 corresponds to an electrically non-conductive layer of polytetrafluoroethylene. The curves show, in each case, the storage stability of the no-load voltage $U_o$ at 45° C as a function of storage time t expressed in months.

FIG. 5 shows that voltage stability of the non-loaded cell is achieved only when the AgO core of the cell is electrically insulated by a non-conducting layer from the cup in accordance with FIG. 2. If a silver or gold layer is used in place of the plastic layer, voltage stability of only a very limited duration is obtained. For nickel, practically no voltage stability is discernible. A cell of particularly high reliability is obtained when, in addition to plastic layer 8, a gold or silver plated cell cup 1 is provided.

In producing cells in accordance with the invention one starts with an AgO powder of grain size between $2\mu$ and $20\mu$. This can be produced, for example, by oxidation of metallic Ag powder with the aid of peroxide sulphate (see U.S. patent application Ser No. 589,562, filed June 23, 1975, whose contents are incorporated herein by reference).

Utilizing the teaching in an article by S. Yoshizawa and Z. Takehara (Journal of the Electrochemical Society of Japan 31, 3, pages 91 to 104, 1963), this oxidation is carried out in known manner by addition of $Au_2O_3$ to enhance the AgO formation rate. Preferably between 2g and 6g of $Au_2O_3$ are used per kilogram of silver powder. To achieve good compression characteristics for the AgO powder, between 1 percent and 4 percent of Teflon powder may be added if desired. To improve the electrical conductivity and add mixture of 2 percent to 10 percent of silver powder may also be made.

The button cell housing may have conventional dimensions, diameter equals 11.4 mm, height equals 5.4 mm. About 800 milligrams AgO powder of the above described mixture are compressed into a tablet (dimensions 10 millimeter × 2 millimeter). This is then wrapped in a 50 micron to a 100 micron thick PTFE foil 8. This may be done by placing a foil disc concentrically upon the cell cup and pressing the tablet down into the cup carrying the central portion of the foil with it. The foil is then folded up and over the top of the tablet. The silver contact ring 9 may simultaneously be pressed into cell cup 1 at high pressure, e.g. about 4 tons.

For high current conditions according to FIG. 2 a contact ring with an internal diameter of 8 millimeter may be used. For low current conditions according to FIG. 3 a contact ring with an internal diameter of 2 millimeter may be used. This has placed beneath it a PTFE-foil 81 with a central aperture of about 4 millimeter diameter. A similar PTFE diaphragm 12 is used in the embodiment of FIG. 4, which again represents a low current embodiment.

In accordance with the invention the silver layer 11, as well as the silver-I-oxide layer beneath it ($Ag_2O$) is only then produced by surface reduction, i.e. after insertion of the AgO tablet. The surface reduction may take place chemically or electrochemically. For electrochemical surface reduction the reduction the prepared positive portion of the cell is inserted in a container with sodium or potash lye. The cup is electrically energized and a counter electrode, e.g. of nickel, is placed above the cell. The electrochemical reduction then proceeds.

It is carried out on the not-yet-closed positive cell portion consisting of elements 1, 2, 8 and 9. Layers 10 and 11 are automatically formed from the AgO body 2 through the surface reduction.

Electrochemical surface reduction is preferred, being carried out with a current density of between 300 mA/cm$^2$ and 600 mA/cm$^2$. A suitable electrolyte is that which is used as the cell electrolyte in the finished product, e.g. 20 percent NaOH + 2 percent ZnO. The electrochemical reduction is complete once 80 to 100 mAH per centimeter$^2$ are derived.

The chemical surface reduction may, for example, be carried out using 80 percent hydrazene monohydrate, sodium boronate, or other suitable reducing agents. The reduction active mass, and the reduction period is to be so proportioned that an equivalent of 80 to 100 mAH per centimeter$^2$ is reduced.

For chemical reduction, the unreduced cell portion is simply inserted in the reducing medium.

The advantage of the electrochemical process consists particularly in the evolution of a thickened silver lay 11 in the vicinity of contact ring 9 (see FIG. 2c and FIG. 3). This enhances the voltage stability of the cell.

This profile of layer 11 is automatically obtained because the reduction begins at the perimeter of the contact ring and then proceeds progressively toward the center.

After washing and drying of the surface reduced portion, its assembly into a finished cell takes place in a conventional manner. Membrane 3 should be oxidation and acid resistant and also should adequately inhibit the Ag-ion diffusion toward the zinc electrode.

This membrane may be of known form, e.g. a porous foil based on PTFE. Preferred is a three-layer construction, the middle layer being cellophane, and the outer layers porous polypropylene.

Button cells in accordance with the invention have capacities between 250 mAH and 280 mAH. The high current embodiment exhibits this capacity at discharge currents of 250 $\mu$A. They tolerate impulse loads up to 80 mA and are well suited, for example, for the operation of wrist watches with light emitting diode display. Their shelf life is lower than that of the low current embodiments described because of their greater self discharge.

The low current embodiment described exhibits the indicated capacity for discharge currents up to 20 $\mu$A. It tolerates impulse loads up to 6 mA. Its self discharge is more than three times as low as for the high current embodiment.

We claim:

1. A galvanic cell having a negative zinc electrode, a positive electrode of bivalent silver oxide, and alkaline electrolyte, and a positive current take-off connector, said cell being characterized in that:

the positive electrode has a surface reduced from bivalent silver oxide to univalent silver oxide so that the cell has the discharge potential of the Ag$_2$O/Zn-system;

an electrically non-conducting plastic layer is positioned to insulate the bivalent silver oxide from the positive current take-off connector; and a porous silver layer is positioned to provide electrical contact between the bivalent silver oxide and the connector, said porous layer facing the counter electrode and being connected via a porous layer of the univalent silver oxide with the bivalent silver oxide.

2. The cell of claim 1 wherein the porous silver layer is electrically connected to the current take-off connector by means of a metallic contact.

3. The cell of claim 2 wherein the metallic contact has a generally planar configuration covering from 10 to 98 percent of the surface area of the bivalent silver oxide facing the counter electrode, the contact being insulated from the bivalent silver oxide by an electrically non-conducting layer, and only the peripheral region of the contact in the vicinity of the exposed surface area of the bivalent silver oxide being electrically connected with the porous silver layer.

4. The cell of claim 1 which comprises a separator layer and wherein in addition to the separator layer a diaphragm is positioned between the porous silver layer and the counter electrode, the diaphragm covering from 10 to 98 percent of the porous silver layer.

5. The cell of claim 1 wherein the electrically non-conducting plastic layer is of polytetrafluorethylene.

6. The cell of claim 1 wherein the current take-off is plated with material selected from the group of silver and gold.

7. The cell of claim 2 wherein the metallic contact is of silver.

8. The method of producing the cell of claim 1 characterized in that:

a tablet of AgO powder provided at least on its bottom and its outer periphery with an insulating envelope is pressed into a cell cup and the surface of the AgO tablet is then electrochemically reduced to porous silver.

9. The method of claim 8 wherein a contact ring is attached to the tablet prior to its being pressed into the cell cup.

10. The galvanic cell produced by the method of claim 8.

11. The cell of claim 1 wherein the surface of the positive electrode which is reduced to univalent silver oxide also faces toward the counter electrode.

12. The cell of claim 11 wherein the surface of the positive electrode facing toward the counter electrode is the only surface reduced to univalent silver oxide.

13. The method of claim 8, wherein a surface layer of the AgO tablet beneath the porous silver is electrochemically reduced to $Ag_2O$, also after the AgO tablet with the insulating envelope has been pressed into the cell cup.

* * * * *